US012654951B1

(12) United States Patent

Bray et al.

(10) Patent No.: US 12,654,951 B1

(45) Date of Patent: Jun. 16, 2026

(54) SYSTEMS AND METHODS TO INDUCT ITEMS DIRECTLY ONTO SHUTTLES

(71) Applicant: Amazon Technologies, Inc., Seattle, WA (US)

(72) Inventors: Michael Alan Bray, Elkhorn, NE (US); Ganesh Krishnamoorthy, Seattle, WA (US); Erika Regan Storvick, Broomfield, CO (US); Zahin Nambiar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1047 days.

(21) Appl. No.: 17/826,542

(22) Filed: May 27, 2022

(51) Int. Cl.
　　*B65G 43/10* 　　(2006.01)
　　*B65G 47/52* 　　(2006.01)

(52) U.S. Cl.
　　CPC ............. *B65G 43/10* (2013.01); *B65G 47/52* (2013.01)

(58) Field of Classification Search
　　CPC ................................ B65G 43/10; B65G 47/52
　　See application file for complete search history.

(56) References Cited

U.S. PATENT DOCUMENTS

| | | | | |
|---|---|---|---|---|
| 6,241,099 B1 * | 6/2001 | Hendrickson | ............. | B07C 3/02 |
| | | | | 209/584 |
| 12,187,551 B1 * | 1/2025 | Teegavarapu | .......... | B65G 15/42 |
| 2013/0277175 A1 * | 10/2013 | Campbell | .............. | B65G 67/08 |
| | | | | 198/586 |
| 2016/0052716 A1 * | 2/2016 | Schnabl | ................. | B65G 1/065 |
| | | | | 414/273 |
| 2019/0047799 A1 * | 2/2019 | Spotti | .................... | B65G 54/02 |

FOREIGN PATENT DOCUMENTS

| | | | | | | |
|---|---|---|---|---|---|---|
| CN | 206557116 U | * | 10/2017 | | | |
| CN | 110065751 A | * | 7/2019 | .......... | B65G 1/0492 |
| CN | 118923571 A | * | 11/2024 | ............. | G01V 3/081 |
| DE | 3606594 A1 | * | 9/1987 | .............. | F16P 3/144 |
| DE | 102016110039 A1 | * | 12/2017 | ............... | B26D 7/32 |

(Continued)

OTHER PUBLICATIONS

DE3606594 EN translation with paragraph numbers espacenet (Year: 1987).*

*Primary Examiner* — Jacob S. Scott
*Assistant Examiner* — Erin Morris
(74) *Attorney, Agent, or Firm* — Eversheds Sutherland (US) LLP

(57) ABSTRACT

Systems and methods are disclosed for induction of items directly onto shuttles. An example system for item induction onto a shuttle may include a track, a shuttle having a conveyor and a permanent magnet, the shuttle configured to move along the track, where the conveyor is configured to support an item thereon, and an electromagnet disposed along the track, where the shuttle is propelled via interaction between the electromagnet and the permanent magnet. The system may include an induction station disposed adjacent to the track, the induction station having a first sensor configured to detect a machine-readable code on the item, a second sensor configured to determine that the item is present on the conveyor of the shuttle, and a display configured to present a user interface, where the item can be manually placed onto the conveyor of the shuttle by an operator at the induction station.

16 Claims, 11 Drawing Sheets

(56)　　　　　　　References Cited

FOREIGN PATENT DOCUMENTS

| | | | | | |
|---|---|---|---|---|---|
| FR | 2494872 | A1 | * | 5/1982 | |
| JP | 2017068593 | A | * | 4/2017 | |
| TW | M638450 | | * | 9/2018 | |
| WO | WO-2012167846 | A1 | * | 12/2012 | ............. B65G 43/08 |
| WO | WO-2017123678 | A1 | * | 7/2017 | ........... B65G 1/0485 |
| WO | WO-2018068026 | A1 | * | 4/2018 | ............. B25J 5/007 |
| WO | WO-2019238673 | A1 | * | 12/2019 | ............. B65G 65/23 |
| WO | WO-2020249244 | A1 | * | 12/2020 | ........... B65G 1/1378 |

* cited by examiner

760

770

SYSTEMS AND METHODS TO INDUCT ITEMS DIRECTLY ONTO SHUTTLES

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
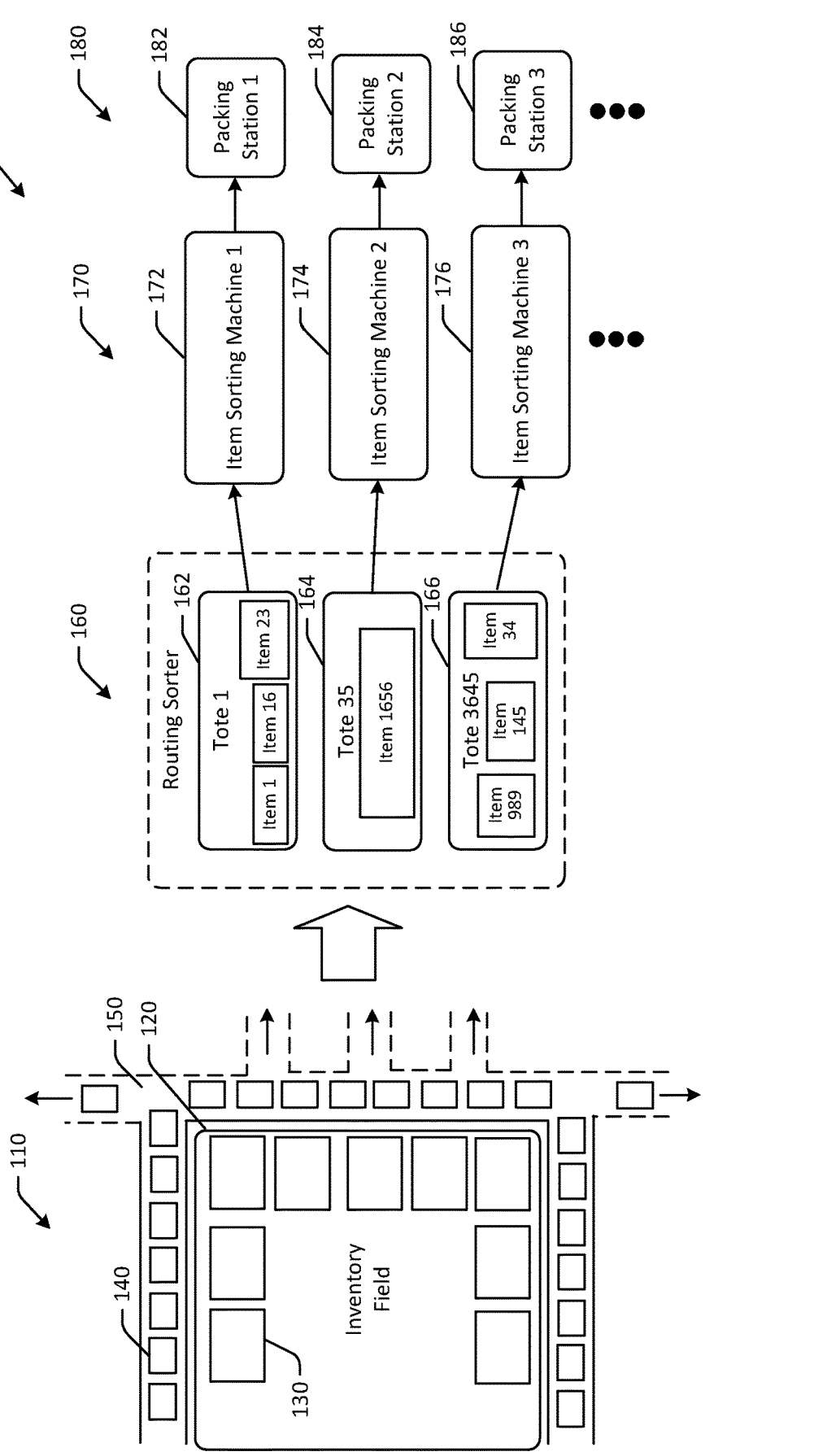
FIG. 1 is a hybrid schematic illustration of an example use case for induction of items directly onto shuttles in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, in some facilities, a container of items may be loaded onto a shuttle, and the shuttle may transport the container from an inventory field to a sortation system or other location.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Embodiments of the disclosure include shuttles configured to transport items without the use of a separate container, in that one or more items may be placed onto the shuttle for transportation (without having to place the item(s) into a container first, and then placing the container onto the shuttle). Shuttles may be used to transport the one or more items from a first location to a second location. Moreover, in addition to transporting items using shuttles without containers, embodiments include manual induction stations that can be disposed adjacent to a track along which shuttles move. The induction stations may allow for items to be inducted or otherwise placed directly onto shuttles, thereby reducing process complexity and eliminating intermediate conveyor belts used during induction.

As a result of the improve functionality provided by the direct induction systems described herein, flexibility and throughput of the processing of items at the fulfillment center may be increased, such as by streamlining an induction process and removing unnecessary conveyors. Some embodiments include optimized process flows for processing of orders at fulfillment centers, as well as process flows or methods to increase speed of consolidating products in a multi-item order as a result of improved speed in transportation of items and/or containers. As a result, throughput of fulfillment centers may be improved, and/or logistics of fulfillment center operations may be less complicated.

Referring to FIG. 1, an example use case 100 for induction of items directly onto shuttles is depicted in accordance with one or more embodiments of the disclosure. Although discussed in the context of online orders, other embodiments may be directed to any suitable use case where containers or items are transported, such as instances where objects are picked from inventory, placed into containers, containers or items are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include rails that may be used to guide shuttles from one location to another. The rails may be used with induction stations and systems for direct induction described herein.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of items and/or containers occurs, systems as described herein may be used for induction of items directly onto shuttles.

Embodiments of the disclosure include systems and methods for induction of items directly onto shuttles. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
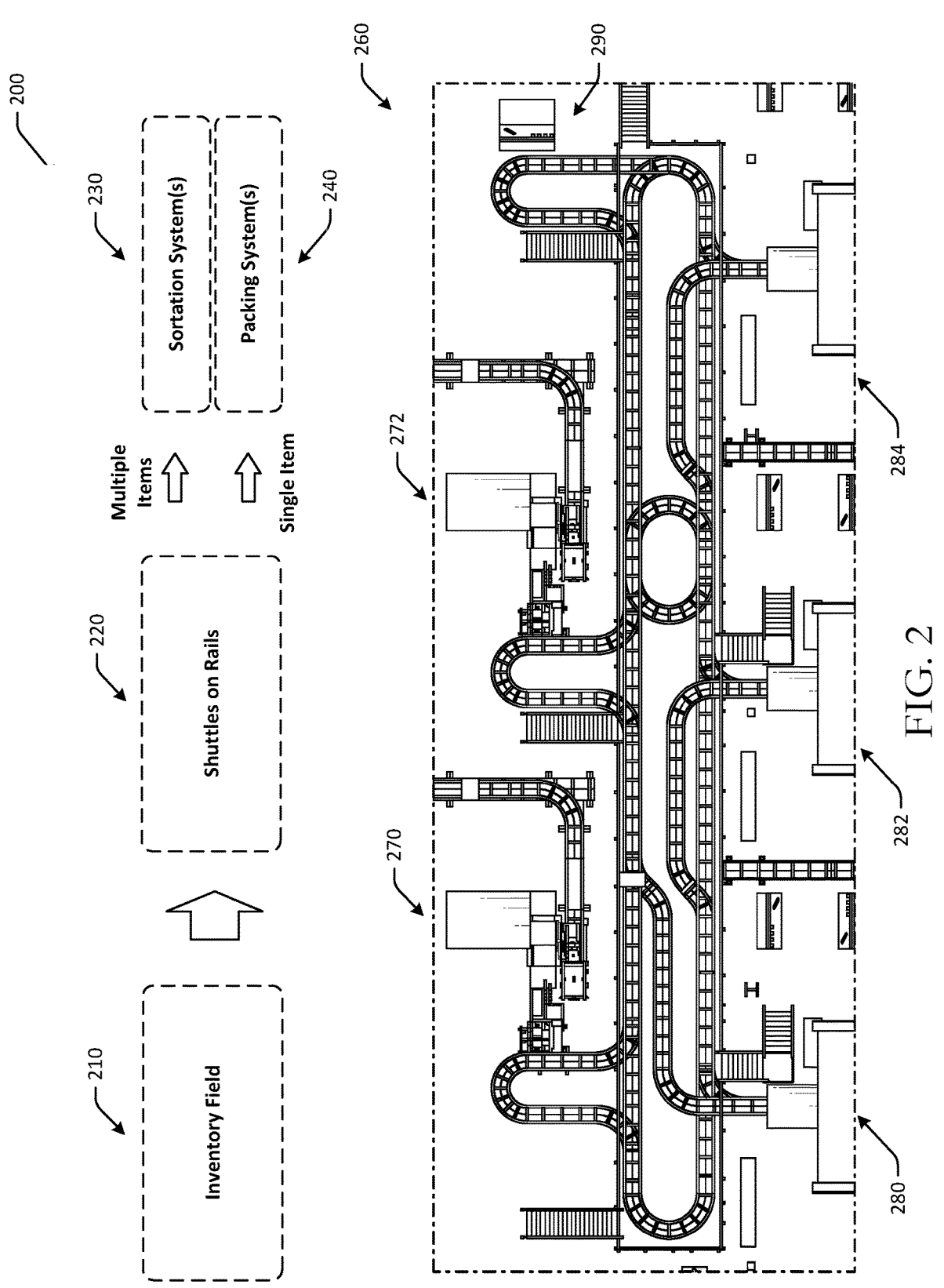
FIG. 2 is a schematic illustration of an example use case and facility layout for induction of items directly onto shuttles in accordance with one or more embodiments of the disclosure.

FIG. 2 is a schematic illustration of an example use case 200 and facility layout for induction of items directly onto shuttles in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using robots, vehicles, or a combination thereof.

The picked products may be placed into one or more containers and the items may be removed from the containers and inducted onto one or more shuttles for transport, such as one or more shuttles on rails 220. The shuttles on rails 220 may include shuttles that are configured to transport items without containers from one location to another via rails. The rails may include switching rail components that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using switching rail components. The rail system 260 may include rails that link various systems, such as sortation systems, to each other and/or to other systems, such as container handling systems, manual induction systems 290, and so forth. For example, the rail system 260 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor surface, such as a belt, that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off of the conveyor belt. The shuttles may include an on-board drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3:
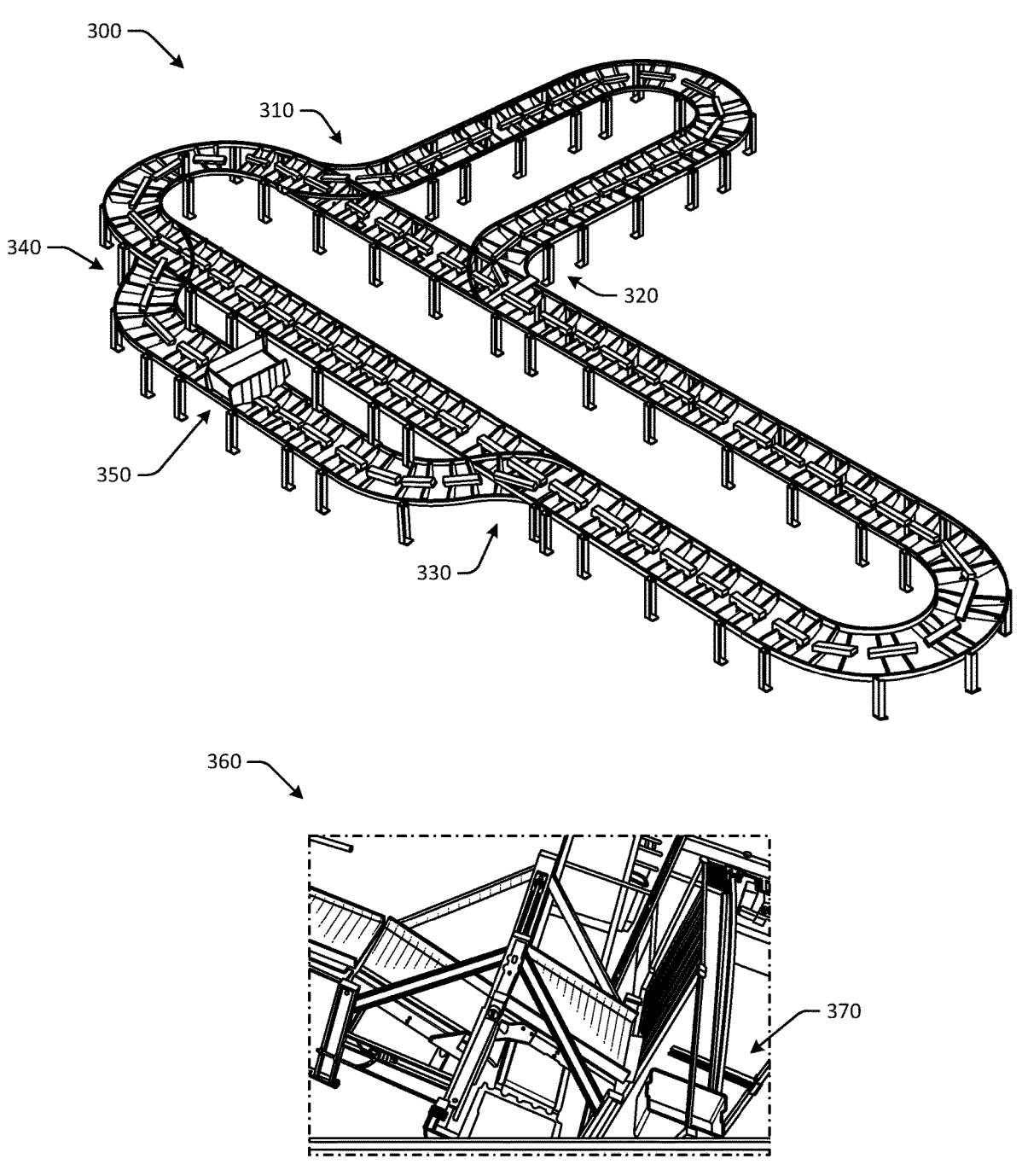
FIG. 3 is a schematic illustration of a perspective view and a close-up view of a shuttle rail system in accordance with one or more embodiments of the disclosure.

FIG. 3 is a schematic illustration of a perspective view and a close-up view of a shuttle rail system 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may be used with the systems for item induction discussed with respect to FIGS. 1-2, and/or may be used with any of the systems described herein.

The shuttle rail system 300 may be configured to provide continuous rail for switching the direction of a shuttle 350 in an electromagnetically propelled shuttle-on-rail arrangement. Shuttle-on-rail arrangements may be used in many systems, such as sortation systems, pick systems, delivery systems, etc. The shuttle rail system 300 may include rail switch mechanisms to allow the rail to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a very narrow gap for optimal performance. Such factors may be impacted by the weight of the payload on the shuttles, which may be increased due to a container weight. Such issues may be avoided by embodiments of the disclosure, where items can be directly placed onto shuttles for transport.

The shuttle rail system 300 may include a first branched path 310, where if shuttles were moving along the shuttle rail system 300 in a clockwise direction, the shuttle could move in either a straight direction along the oval path of the shuttle rail system 300, or may make a left-handed curve onto a separate path of the shuttle rail system 300. Similarly, a second branched path 320 may allow for merging of shuttles that took a left curve at the first branched path 310 to merge back onto the oval path of the shuttle rail system 300. Any number of curved path and straight path intersections may be included in the shuttle rail system 300. For example, the shuttle rail system 300 may include a third branched path 330 and a fourth branched path 340. The shuttle rail system 300 may form a closed loop track in some embodiments.

An induction path may be connected to the shuttle rail system 300 and may be accessible via the shuttle rail system 300. For example, the shuttle 350 moving along the shuttle rail system 300 is depicted positioned along an induction path, where an operator may induct items onto the shuttle 350 for transport. An example induction portion 370 is depicted in close-up view 360, where items can be removed from a tote or other container and deposited onto a shuttle by an operator or a robotic manipulator during an item induction process.

Figure 4A:
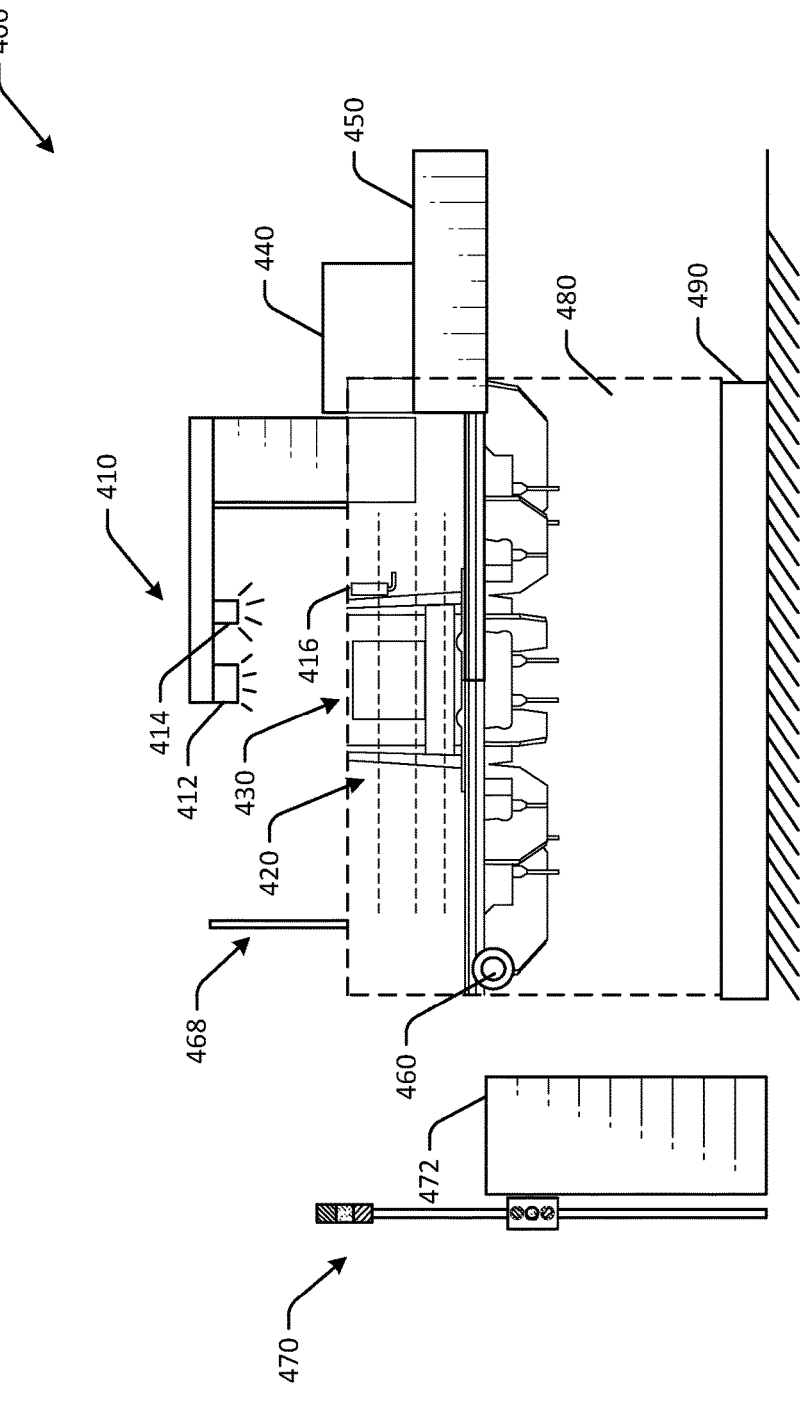
FIGS. 4A-4B are schematic illustrations of various views of an induction station in accordance with one or more example embodiments of the disclosure.
Figure 4B:
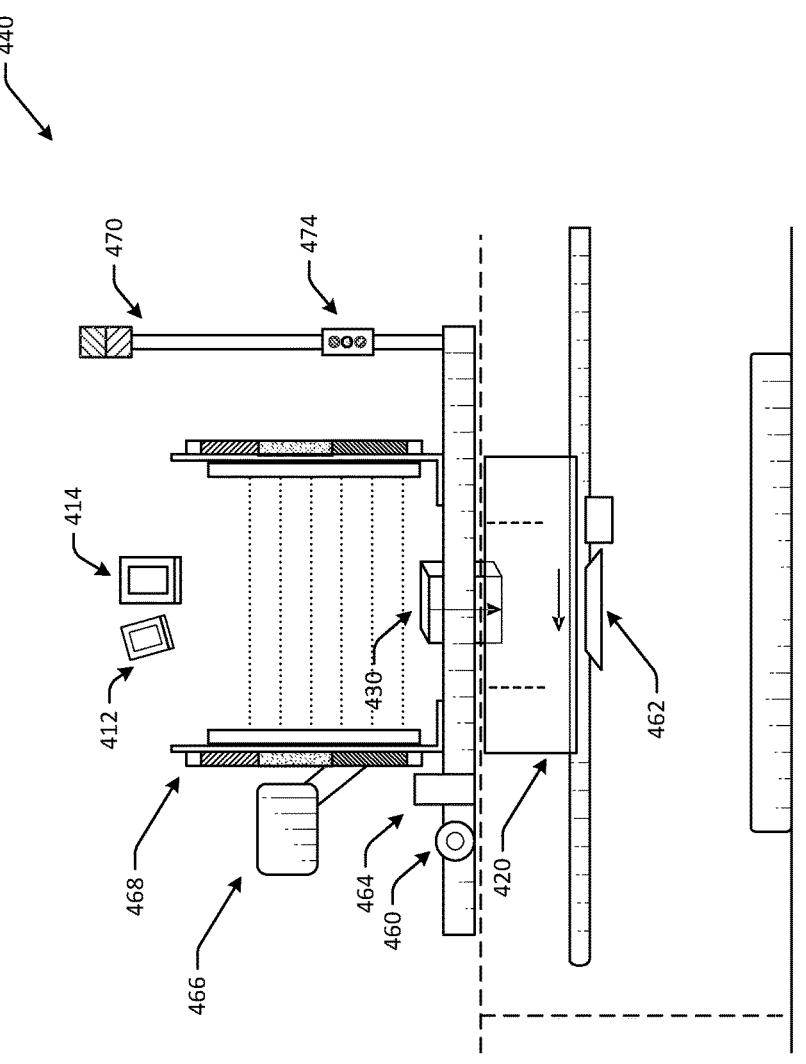

FIGS. 4A-4B are schematic illustrations of various views of an induction station 400 in accordance with one or more example embodiments of the disclosure. Other embodiments may include additional or fewer components. The illustration of FIGS. 4A-4B are not to scale, and may not be illustrated to scale with respect to other figures. The induction station illustrated in FIGS. 4A-4B may be used with the same shuttle and shuttle rail system discussed with respect to FIGS. 1-3.

FIG. 4A depicts a portion of the induction station 400 in a side schematic view. The induction station 400 may be coupled to a shuttle rail system having one or more sets of rails on which shuttles 420 may ride. The rails may guide shuttles 420 to various locations. Each set of rails may include two rails, so as to support two sides of a shuttle 420 on the rails. The shuttle rail system may include a number of supports disposed between the two rails of a set of rails. A number of electromagnets may optionally be disposed along the rails at various intervals. The electromagnets may be configured to propel shuttles along the respective sets of rails. The shuttle 420 may include wheels that engage the rails. Some embodiments may include four wheels, while other embodiments may include different numbers of wheels. Any suitable number and size of wheels may be used to engage with the rails. The shuttle 420 may include a permanent magnet disposed underneath the shuttle 420. The permanent magnet may interact with the electromagnets to electromagnetically propel the shuttle 420. The electromagnets may therefore be a linear synchronous motor in some embodiments. Although the shuttle 420 is depicted as traveling in a sideways configuration with respect to the shuttle rail system (e.g., a payload on the shuttle 420 may be moving sideways with respect to the shuttle rail system, etc.), in other embodiments, the shuttle 420 may be oriented differently.

The shuttle rail system may therefore include the set of rails that form a track having a central axis. The set of rails may include a first rail segment on a first side of the central axis and a second rail segment on a second side of the central axis. The shuttle rail system may include the set of electromagnets disposed along the central axis of the track. The shuttle rail system may be used with the shuttles 420, where the shuttles 420 are configured to transport individual items from a first location to a second location using the set of rails. The shuttle may include a first pair of wheels disposed at a front end of the shuttle 420, and a second pair of wheels disposed at a rear end of the shuttle 420. In some embodiments, the shuttle 420 may include a conveyor assembly having a central axis that is transverse to the central axis of the track, such as in the embodiment depicted in FIG. 4A. The shuttle 420 may include the permanent magnet coupled to a lower surface of the shuttle 420. The permanent magnet may be configured to engage with the set of electromagnets to propel the shuttle 420.

Embodiments of the disclosure may include the induction station 400, which may be a manual induction station, and may be positioned adjacent to the rails or track along which the shuttles 420 move. The induction station 400 may include an overhead support 410. One or more sensors may be coupled to the overhead support 410. For example, a first sensor 412, such as an object detection sensor, a camera, or another type of sensor may be coupled to the overhead support 410. The first sensor 412 may be configured to detect whether an item 430 is present on the shuttle 420. A second sensor 414 may be coupled to the overhead support 410. The second sensor 414 may be a scanner, an optical sensor, a camera, or another type of sensor that is configured to read or detect one or more machine-readable codes, such as barcodes, QR codes, RFIDs, and/or other types of codes. The second sensor 414 may be used to identify an item for placement onto the shuttle 420 and/or an item that is present on the shuttle 420. Any number of sensors may be coupled to the overhead support 410.

The induction station 400 may include a third sensor 416 that may be configured to identify the shuttle 420. For example, the third sensor 416 may be a camera, a barcode scanner, an RFID sensor, an NFC sensor, and/or another type of sensor configured to identify the shuttle 420. In some embodiments, the third sensor 416 may be disposed adjacent to the shuttle loading zone, as depicted in FIG. 4A, whereas in other embodiments, the third sensor 416 may be positioned elsewhere, such as coupled to the overhead support 410.

The induction station 400 may include an emergency stop button 460 configured to pause operation of the entire system. The induction station 400 may include one or more visual indicators 470, such as one or more colored lights that can be used to provide visual indicators to operators. The induction station 400 may include a support 472 that can have one or more shelves and may be configured to store items, such as waste bags, water bottles, scanners, and so forth. The support 472 may be a support stand having at least one shelf.

The induction station 400 may include a light curtain 468 formed between a light receiver and a light emitter, where interruption of light between the receiver and emitter may indicate the presence of an obstacle. If an obstacle is detected, operation of the system may immediately be paused. The induction station 400 may include a safety barrier 480 and an optional platform 490 for operator comfort. The platform 490 may be height-adjustable in some embodiments, thereby allowing operators of different heights to operate the induction station with improved ergonomics.

The induction station 400 may be disposed adjacent a surface 450, which may be a conveyor or other materials handling surface, that a container 440 may be disposed on. An operator may remove items from the container 440 and place the items directly onto the shuttle 420 during an item induction process. Accordingly, the container 440 may not be needed for transport of the item on the shuttle 420.

In FIG. 4B, the induction station 400 is depicted with a different configuration, in which the visual indicators 470 are disposed on an opposite side. One or more buttons 474 may cause activation of a corresponding visual indicator 470. A user interface 466 may be disposed on a vertical support coupled to the overhead support 410. A hand scanner 464 may be included for manual scanning of items during induction. Inductive power may be provided to the shuttle 420 using one or more inductive coils 462 or other wireless power source during item induction.

The shuttle 420 may therefore move along the track to a downstream destination. The track may, in some embodiments, connect a first item sortation system to a second item sortation system. The induction station 400 may be a standalone component and may be portable in some embodiments. In other embodiments, the induction station 400 may be part of a system that includes the track, the shuttle having a conveyor and a permanent magnet, the shuttle configured to move along the track, where the conveyor is configured to support an item thereon, an electromagnet disposed along the track, where the shuttle is propelled via interaction between the electromagnet and the permanent magnet, and the induction station 400.

The induction station 400 may be disposed adjacent to the track, and may include the first sensor 412 and the second sensor 414. The sensors may individually or collectively be configured to detect a machine-readable code on the item and/or to determine that the item is present on the conveyor of the shuttle. The induction station 400 may include a display configured to present the user interface 466. Items can be manually placed onto the conveyor of the shuttle by an operator at the induction station 400. The induction station 400 may include an overhead mount or overhead support having a light source. The first sensor and the second sensor may be disposed on the overhead support. The induction station 400 may include a third sensor configured to identify the shuttle. Any number of sensors may be included. The induction station 400 may include the emergency stop button configured to pause operation of the system, along with a set of visual indicators and a set of buttons, where interaction with a button of the set of buttons causes activation of a corresponding visual indicator of the set of visual indicators. The induction station 400 may include the light curtain 468 configured to detect the presence of an obstacle, and a controller configured to pause operation of the system based on feedback from the light curtain.

Figure 5A:
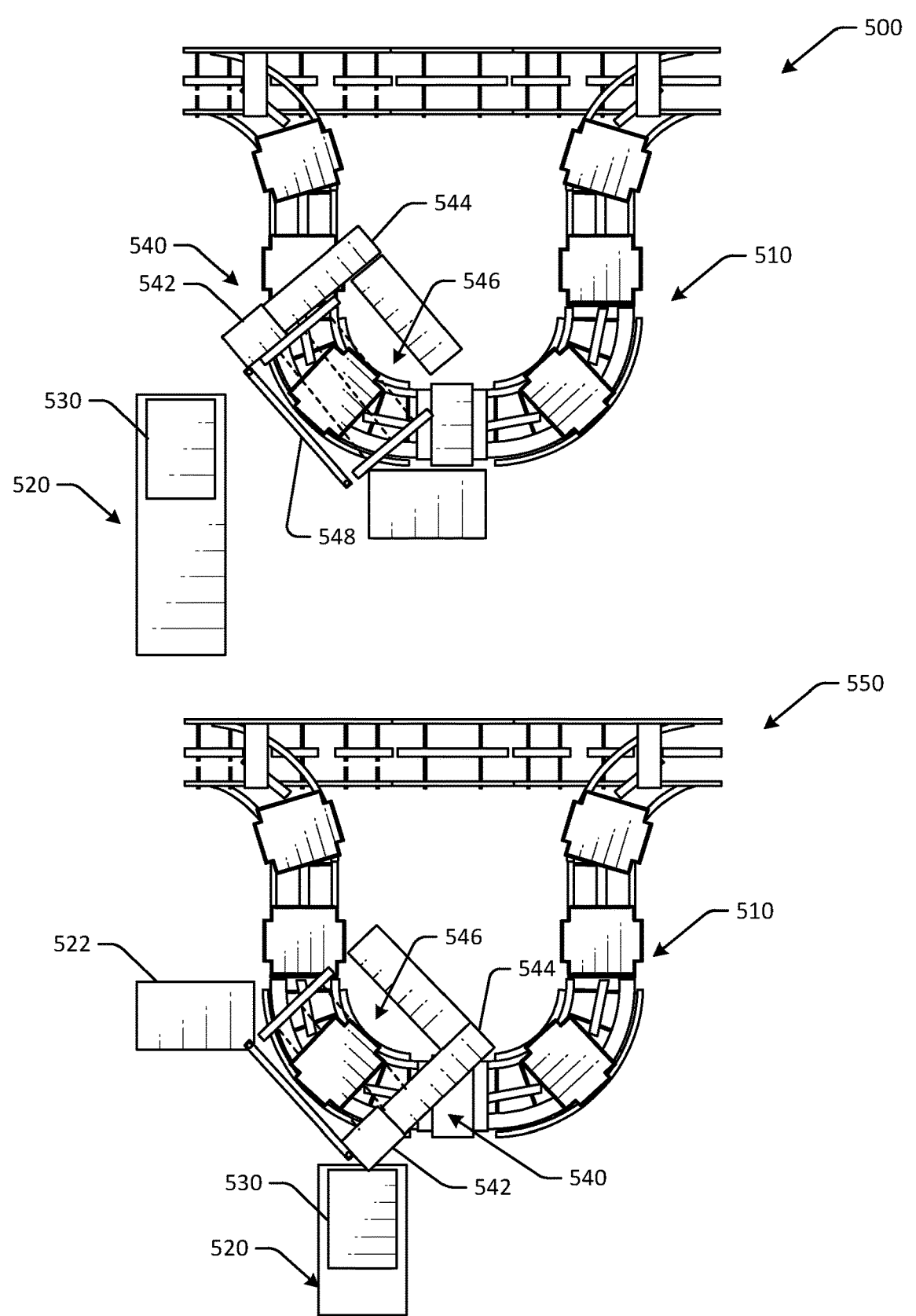
FIGS. 5A-5B are schematic illustrations of various views of an induction station and a shuttle rail system in accordance with one or more example embodiments of the disclosure.
Figure 5B:
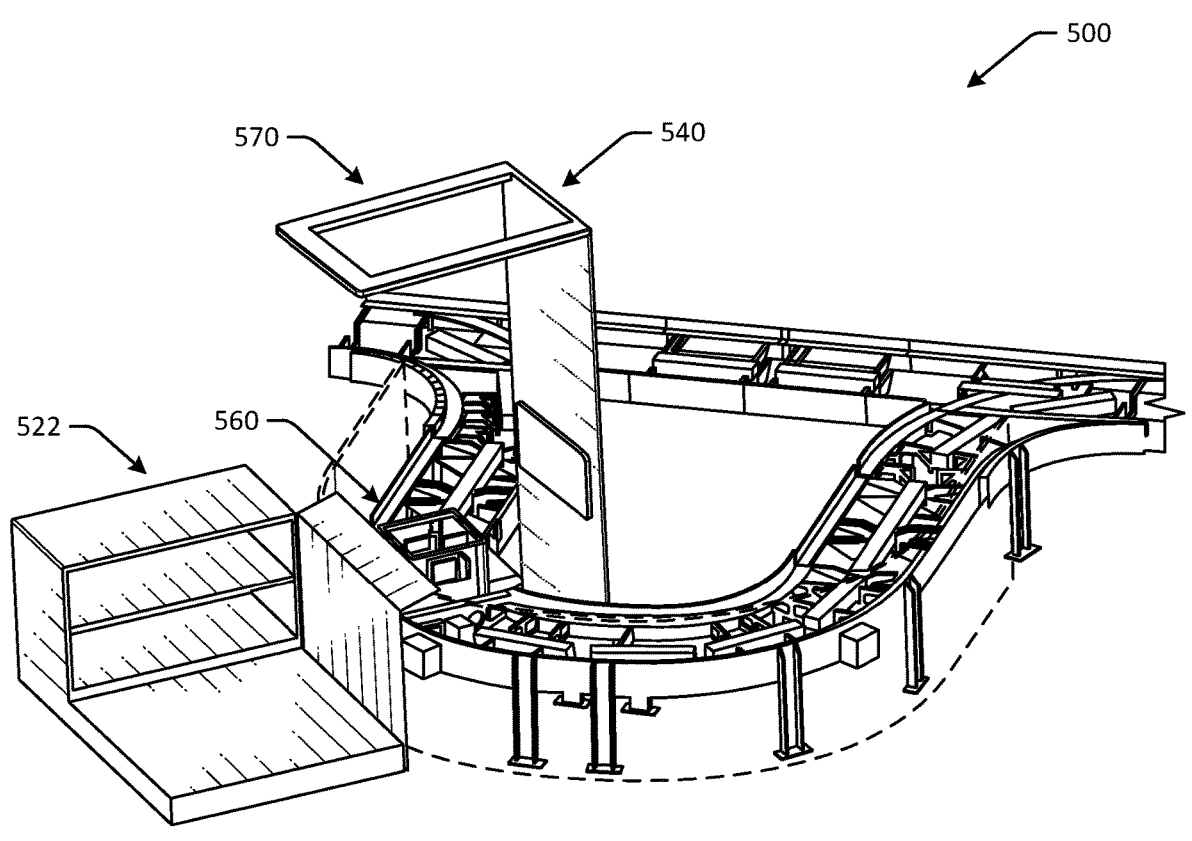

FIGS. 5A-5B are schematic illustrations of various views of an induction station in accordance with one or more example embodiments of the disclosure. Other embodiments may include additional or fewer components. The illustration of FIGS. 5A-5B are not to scale, and may not be illustrated to scale with respect to other figures. The system illustrated in FIGS. 5A-5B may include the same induction station and shuttle rail system discussed with respect to FIGS. 1-4B.

In FIG. 5A, a system 500 with a right-handed induction station 540 is depicted. The induction station 540 may be disposed adjacent to a track 510 and a conveyor 520. An operator may retrieve items from a container 530 on the conveyor 520 and place the items onto a shuttle 546. The induction station 540 may include an overhead support 544 and a display 542 configured to present a user interface. A light curtain 548 may provide additional safety for an operator. An operator at the induction station 540 may be right-handed and may perform the induction process ergonomically. The conveyor 520 may be disposed adjacent to the induction station, where the conveyor is configured to transport the item to the induction station (e.g., with or without a conveyor). If the induction station is a right-handed induction station, the conveyor 520 may be disposed at a left side of the induction station.

Also depicted in FIG. 5A is a system 550 with a left-handed induction station 540. The induction station 540 may be disposed adjacent to a track 510 and a conveyor 520. An operator may retrieve items from a container 530 on the conveyor 520 and place the items onto a shuttle 546. The induction station 540 may include an overhead support 544 and a display 542 configured to present a user interface. A light curtain 548 may provide additional safety for an operator. An operator at the induction station 540 may be left-handed and may perform the induction process ergonomically. The conveyor 520 may be disposed adjacent to the induction station, where the conveyor is configured to transport the item to the induction station (e.g., with or without a conveyor). If the induction station is a left-handed induction station, the conveyor 520 may be disposed at a right side of the induction station. FIG. 5B depicts the system 500 having the left-handed induction station 540 in a perspective view with an induction portion 560 of the track and overhead lighting 570 illustrated.

Figure 6:
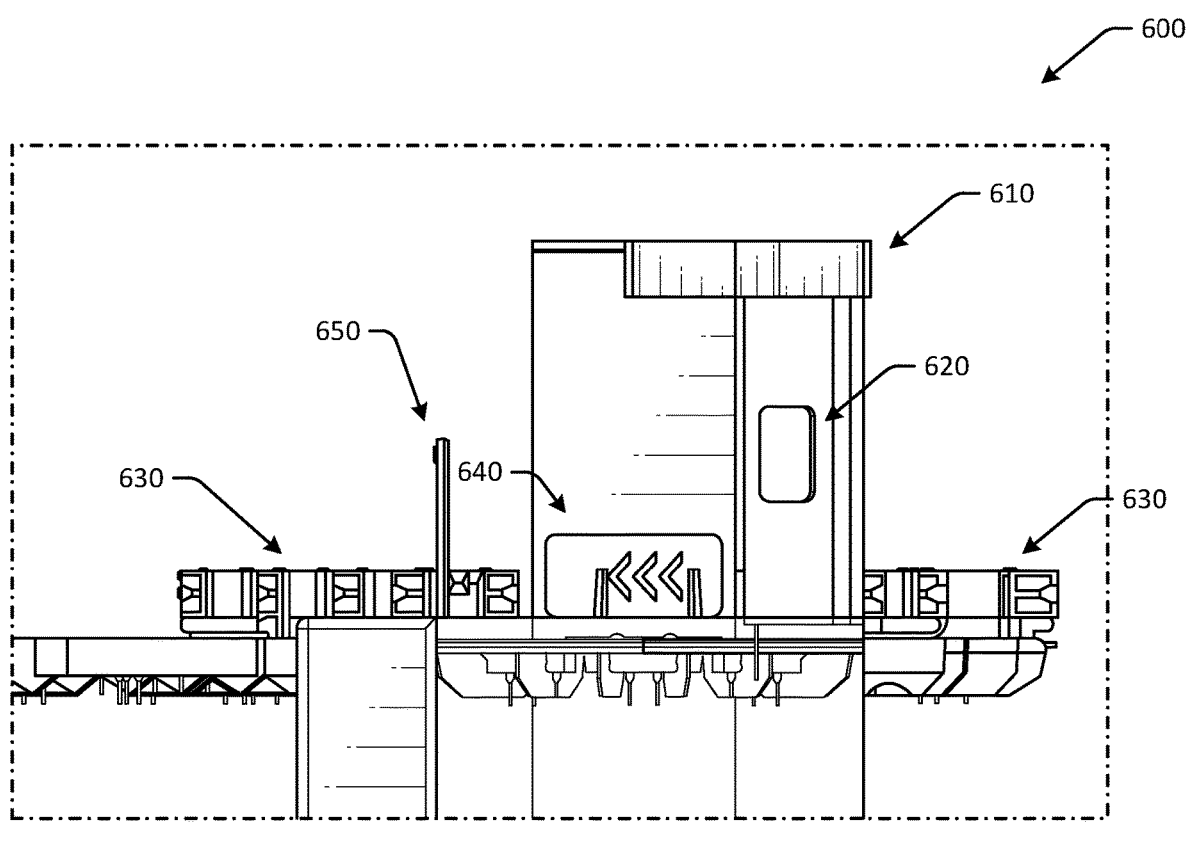
FIG. 6 is a schematic illustration of an induction station and a shuttle rail system in accordance with one or more embodiments of the disclosure.

FIG. 6 is a schematic illustration of an induction station and a shuttle rail system in accordance with one or more embodiments of the disclosure. Other embodiments may include additional or fewer components. The illustrations of FIG. 6 is not to scale, and may not be illustrated to scale with respect to other figures. The induction station illustrated in FIG. 6 may be the same induction station discussed with respect to FIGS. 1-5B.

In FIG. 6, a system 600 may include one or more shuttles 630 configured to receive items directly without a container at an induction station 640. The induction station 640 may include a user interface 620, an overhead support 610 configured to support one or more sensors, one or more lighting sources, and/or other components. A light curtain 650 or other type of safety sensor may be used to automatically de-energize the system 600.

Figure 7A:
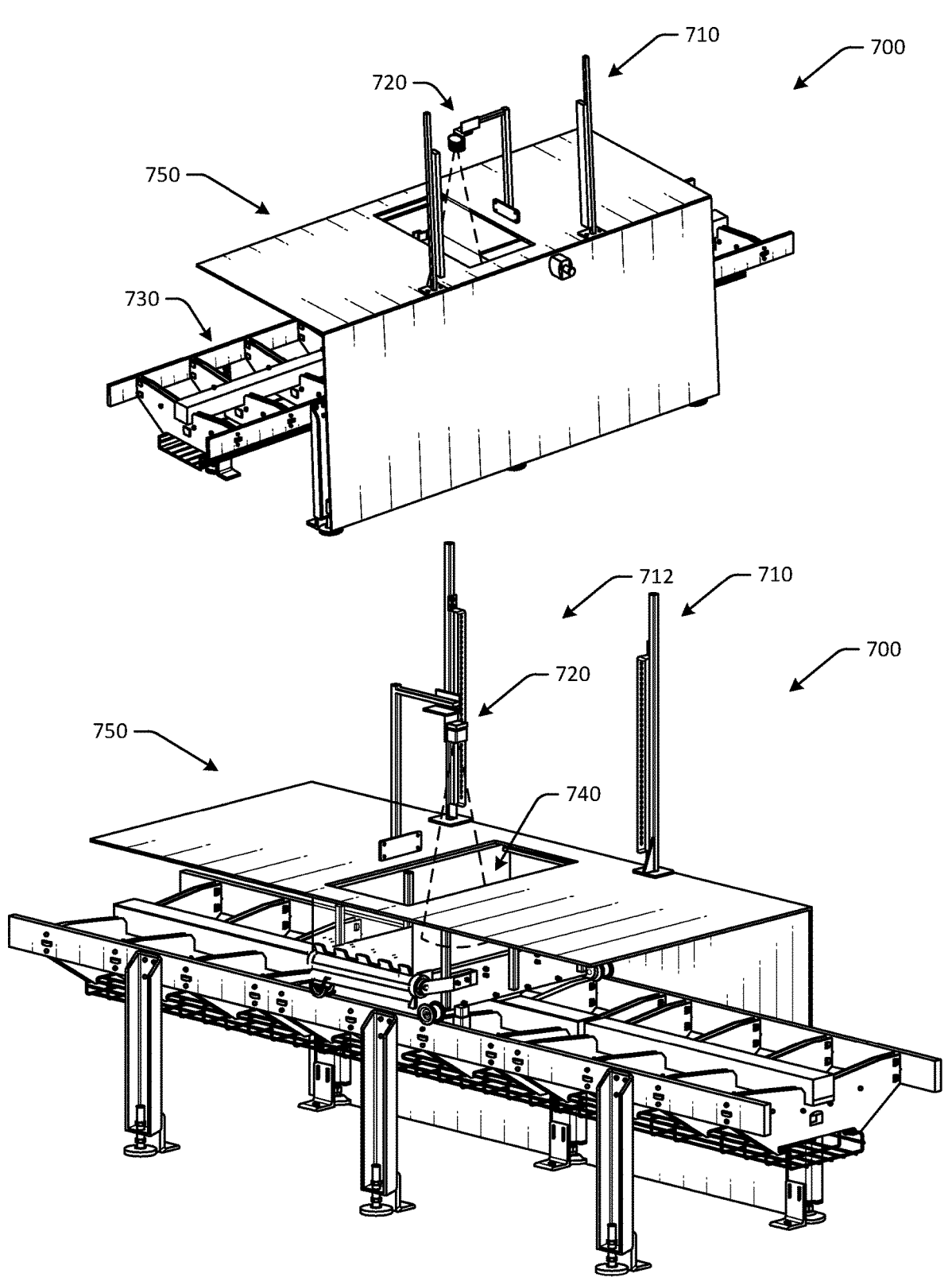
FIGS. 7A-7B are schematic illustrations of an induction station and a shuttle rail system in different configurations in accordance with one or more embodiments of the disclosure.
Figure 7B:
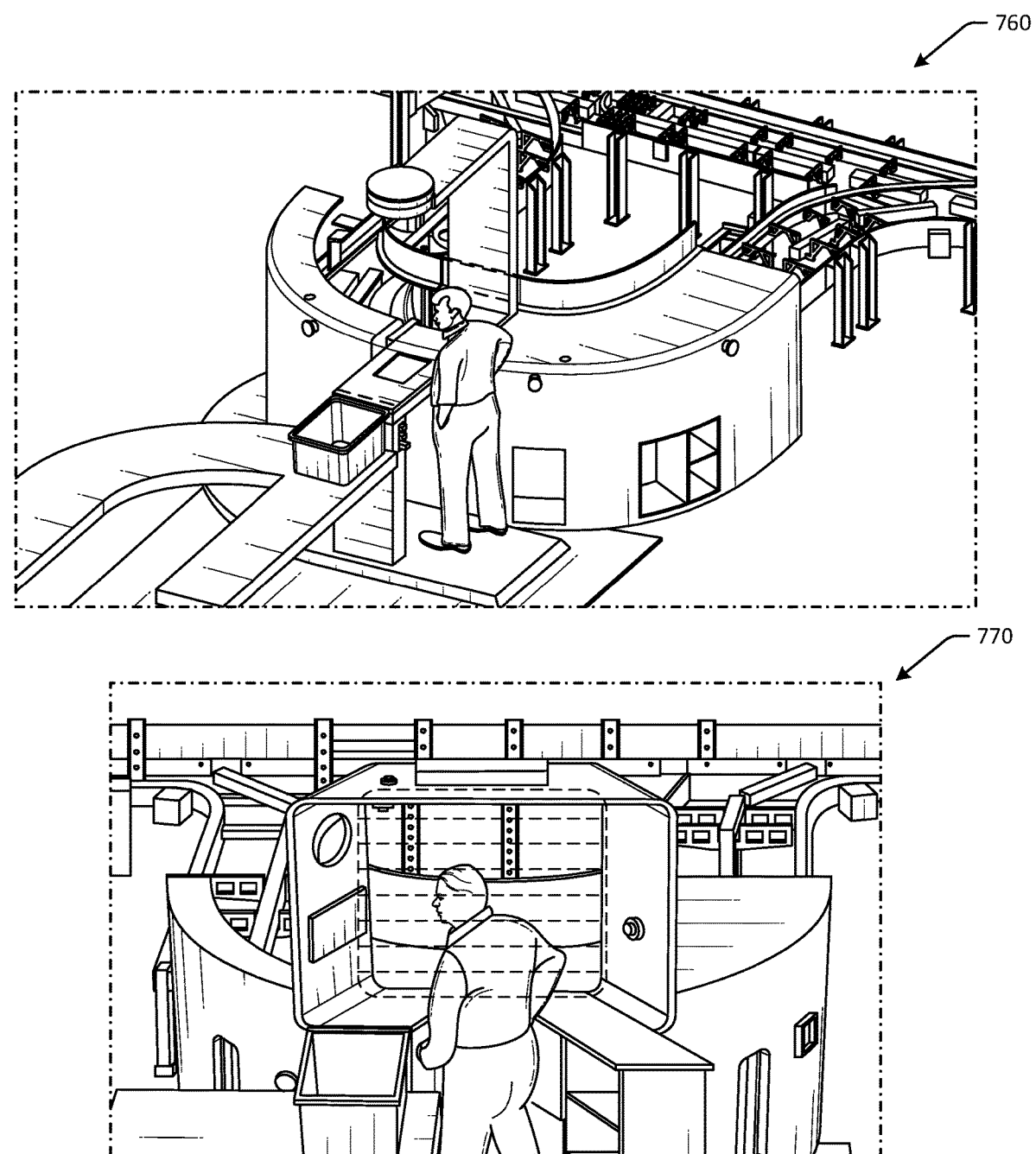

FIGS. 7A-7B are schematic illustrations of an induction station and a shuttle rail system in different configurations. Other embodiments may include additional or fewer components. The illustrations of FIGS. 7A-7B are not to scale, and may not be illustrated to scale with respect to other figures. The induction stations illustrated in FIGS. 7A-7B may be the same induction stations discussed with respect to FIGS. 1-6.

In FIG. 7A, a system 700 is depicted in front and rear perspective views. The system 700 may include an induction station. The induction station may include one or more overhead sensors 720, one or more safety features 710 (such as a light curtain 712), and a workstation surface 750 having a cutout 740 that provides access to a shuttle moving along a track 730 disposed under the workstation surface 750.

The track 730 may have a central axis, and may be formed of a first rail segment on a first side of the central axis and a second rail segment on a second side of the central axis. The shuttle may be configured to transport one or more items from a first location to a second location using the track 730. The shuttle may include a permanent magnet and a conveyor assembly having a central axis that is transverse to the central axis of the track, where the shuttle is configured to support the one or more items on the conveyor assembly. The system may include a set of electromagnets disposed along the central axis of the track 730, where the set of electromagnets interact with the permanent magnet to propel the shuttle. The system may optionally include a conveyor configured to transport the one or more items adjacent to the track, and the induction station disposed adjacent to both the track and the conveyor. The induction station may include a first sensor configured to detect machine-readable codes on the one or more items, a second sensor configured to determine that an item is present on the first conveyor assembly of the shuttle, and a light curtain configured to detect the presence of an obstacle. The induction station may include a display configured to present a user interface, where items from the conveyor can be manually removed from the conveyor and placed onto the conveyor assembly of the shuttle by an operator at the induction station.

In FIG. 7B, a straight-line induction station 760 is depicted, where an operator may induct items from a tote or conveyance surface directly into a shuttle with limited movement and improved ergonomics. In some embodiments, a conveyance structure for containers may flow in a curved or non-linear path, as depicted in FIG. 7B. In another example, an angled line induction station 770 is depicted, where an operator may retrieve items for induction from a container that is conveyed to the operator, and the operator may use the angled line induction station 770 regardless of whether the operator is left handed or right handed. Additional embodiments may have different configurations than those depicted in the examples of FIGS. 1-7B.

One or more operations of the methods, process flows, or use cases of FIGS. 1-7B may have been described above as being performed by a user device, or more specifically, by one or more program module(s), applications, or the like executing on a device. It should be appreciated, however, that any of the operations of the methods, process flows, or use cases of FIGS. 1-7B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7B may be described in the context of the illustrative devices, it should be appreciated that such operations may be implemented in connection with numerous other device configurations.

The operations described and depicted in the illustrative methods, process flows, and use cases of FIGS. 1-7B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
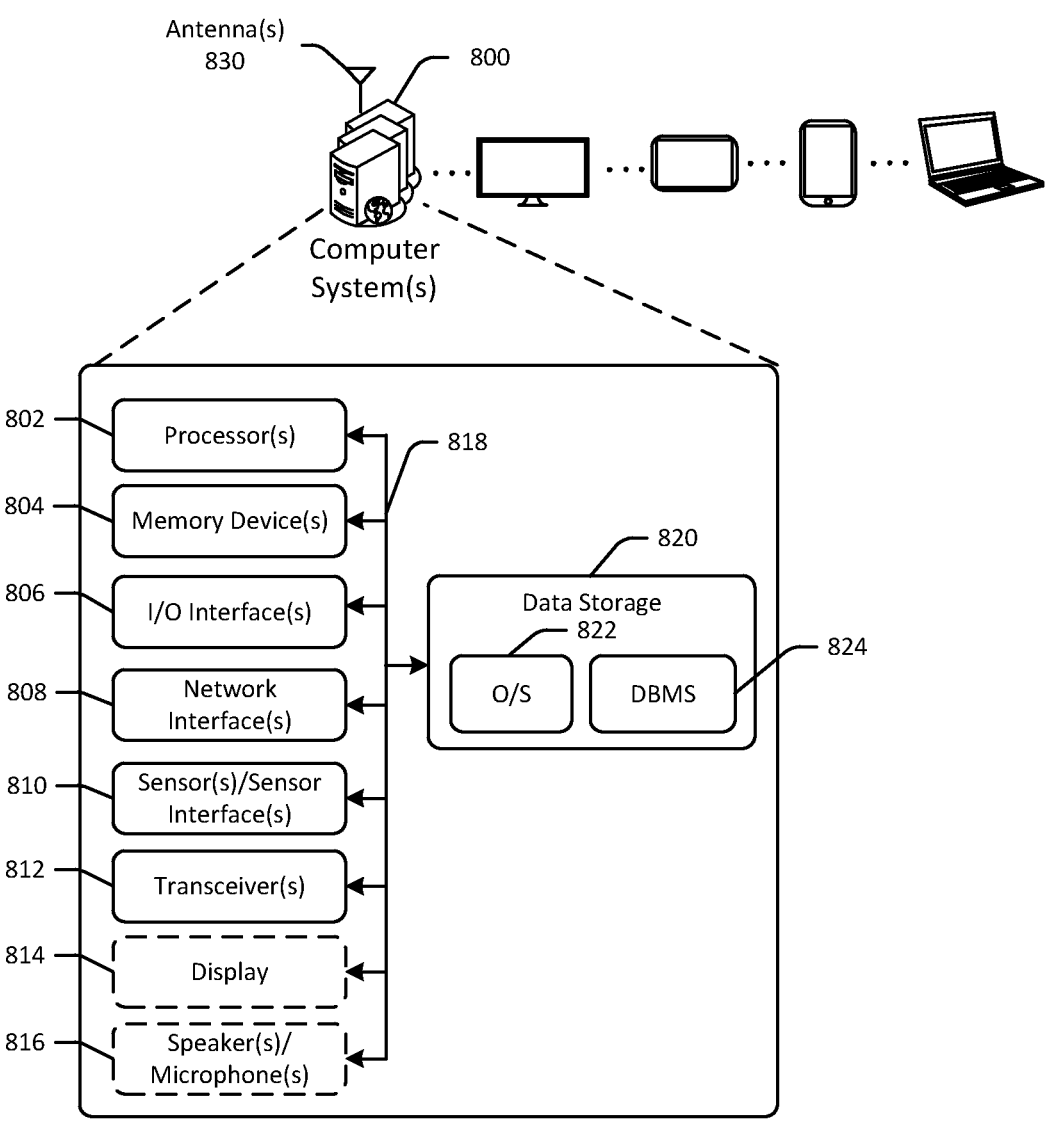
FIG. 8 schematically illustrates an example architecture of a computer system associated with a shuttle rail and/or induction system in accordance with one or more embodiments of the disclosure.

FIG. 8 is a schematic block diagram of one or more illustrative computer system(s) 800 associated with a shuttle rail and/or induction system in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller(s) of FIGS. 1-7B. For example, the computer system(s) 800 may be a controller and may control one or more aspects of the systems and methods to induct items directly onto shuttles described in FIGS. 1-7B.

The computer system(s) 800 may be configured to communicate with one or more servers, user devices, or the like. The computer system(s) 800 may be configured to perform shuttle diagnostics, identify shuttles, direct shuttles, move shuttles, determine sensor feedback, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s).

Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
a track having a central axis, the track comprising a first rail segment on a first side of the central axis and a second rail segment on a second side of the central axis;
a shuttle configured to transport one or more items from a first location to a second location using the track, the shuttle comprising a permanent magnet and a first conveyor assembly having a central axis that is transverse to the central axis of the track, wherein the first shuttle is configured to support the one or more items on the first conveyor assembly;
a set of electromagnets disposed along the central axis of the track, wherein the set of electromagnets interact with the permanent magnet to propel the shuttle;
a conveyor configured to transport the one or more items adjacent to the track; and
an induction station disposed adjacent to both the track and the conveyor, the induction station comprising:
a first sensor configured to detect machine-readable codes on the one or more items;
a second sensor configured to determine that an item is present on the first conveyor assembly of the shuttle;
a third sensor configured to identify the shuttle;
a light curtain configured to detect the presence of an obstacle;
a workstation surface disposed over the track, the workstation surface comprising a cutout for access to the shuttle; and
a display configured to present a user interface;
wherein items from the conveyor can be manually removed from the conveyor and placed onto the first conveyor assembly of the shuttle by an operator at the induction station.

2. The system of claim 1, wherein the induction station further comprises:
an overhead support comprising a light source;
wherein the first sensor and the second sensor are disposed on the overhead support.

3. The system of claim 1, wherein the induction station further comprises:
a height-adjustable platform disposed adjacent to the track; and
a support stand comprising at least one shelf.

4. The system of claim 1, wherein the induction station is a right-handed induction station, and the conveyor is disposed at a left side of the induction station; or
wherein the induction station is a left-handed induction station, and the conveyor is disposed at a right side of the induction station.

5. A system comprising:
a track;
a shuttle comprising a conveyor and a permanent magnet, the shuttle configured to move along the track, wherein the conveyor is configured to support an item thereon;
an electromagnet disposed along the track, wherein the shuttle is propelled via interaction between the electromagnet and the permanent magnet;
a workstation surface disposed over the track, the workstation surface comprising a cutout for access to the shuttle; and
an induction station disposed adjacent to the track, the induction station comprising:
a first sensor configured to detect a machine-readable code on the item;
a second sensor configured to determine that the item is present on the conveyor of the shuttle;
a third sensor configured to identify the shuttle; and
a display configured to present a user interface;
wherein the item can be manually placed onto the conveyor of the shuttle by an operator at the induction station.

6. The system of claim 5, wherein the induction station further comprises:

an overhead support comprising a light source;

wherein the first sensor and the second sensor are disposed on the overhead support.

7. The system of claim 5, wherein the induction station further comprises:

a height-adjustable platform disposed adjacent to the track; and a support stand comprising at least one shelf.

8. The system of claim 5, wherein the induction station further comprises:

an emergency stop button configured to pause operation of the system.

9. The system of claim 5, wherein the induction station further comprises:

a set of visual indicators; and a set of buttons;

wherein interaction with a button of the set of buttons causes activation of a corresponding visual indicator of the set of visual indicators.

10. The system of claim 5, further comprising:

a conveyor disposed adjacent to the induction station, wherein the conveyor is configured to transport the item to the induction station;

wherein the induction station is a right-handed induction station, and the conveyor is disposed at a left side of the induction station.

11. The system of claim 5, wherein the induction station further comprises:

a light curtain configured to detect the presence of an obstacle; and a controller configured to pause operation of the system based on feedback from the light curtain.

12. The system of claim 5, wherein the track connects a first item sortation system to a second item sortation system.

13. The system of claim 5, wherein the induction station is a portable induction station.

14. An induction station for inducting an item onto a shuttle, the induction station comprising:

a first sensor configured to detect a machine-readable code on the item;

a second sensor configured to determine that the item is present on a conveyor of the shuttle;

a third sensor configured to identify the shuttle;

a workstation surface comprising a cutout for access to the shuttle; and a display configured to present a user interface;

wherein the item can be manually placed onto the conveyor of the shuttle by an operator at the induction station.

15. The induction station of claim 14, further comprising:

an overhead support comprising a light source;

wherein the first sensor and the second sensor are disposed on the overhead support.

16. The induction station of claim 14, further comprising:

a light curtain configured to detect the presence of an obstacle; and a controller configured to pause operation of the system based on feedback from the light curtain.

* * * * *